(12) United States Patent
Yang et al.

(10) Patent No.: US 11,289,736 B2
(45) Date of Patent: Mar. 29, 2022

(54) POLYMER ELECTROLYTE MATERIAL FOR LITHIUM BATTERY CELLS

(71) Applicant: Robert Bosch GmbH, Stuttgart (DE)

(72) Inventors: Jin Yang, Pleasanton, CA (US); Hany Eitouni, Oakland, CA (US); Jonathan Mailoa, Cambridge, MA (US)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 16/451,782

(22) Filed: Jun. 25, 2019

(65) Prior Publication Data
US 2020/0411905 A1    Dec. 31, 2020

(51) Int. Cl.
*H01M 10/0565* (2010.01)
*H01M 10/052* (2010.01)
*C08G 79/04* (2006.01)

(52) U.S. Cl.
CPC ..... *H01M 10/0565* (2013.01); *H01M 10/052* (2013.01); *C08G 79/04* (2013.01); *H01M 2300/0082* (2013.01)

(58) Field of Classification Search
CPC ............. C08G 79/04; H01M 10/052; H01M 10/0565; H01M 10/0568; H01M 2300/0082; H01M 2300/0091
See application file for complete search history.

(56) References Cited

FOREIGN PATENT DOCUMENTS

| CN | 103840128 A | 6/2014 | |
|----|-------------|--------|---|
| CN | 107819151 A | 3/2018 | |
| CN | 107863555 A | 3/2018 | |
| WO | WO-2018016195 A1 * | 1/2018 | ........ H01M 10/0567 |

OTHER PUBLICATIONS

Wu, Lei, et al. "A new phosphate-based nonflammable electrolyte solvent for Li-ion batteries." Journal of Power Sources 188.2 (2009): 570-573.
Liaw, Der-Jang, and Pi-Sheng Chen. "Synthesis of fluorine-containing polyphosphonates: low temperature solution polycondensation of bisphenol AF and phenylphosphonic dichloride." Polymer 36.23 (1995): 4491-4495.

* cited by examiner

*Primary Examiner* — Adam A Arciero
(74) *Attorney, Agent, or Firm* — Brooks Kushman P.C.

(57) ABSTRACT

Lithium battery electrolyte materials comprising fluorinated phosphonates and having a polymer structure defined by:

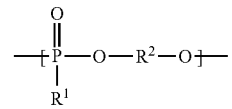

where $R^1$ is $-CF_3$, $-(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE) and $R^2$ is $-(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

20 Claims, 1 Drawing Sheet

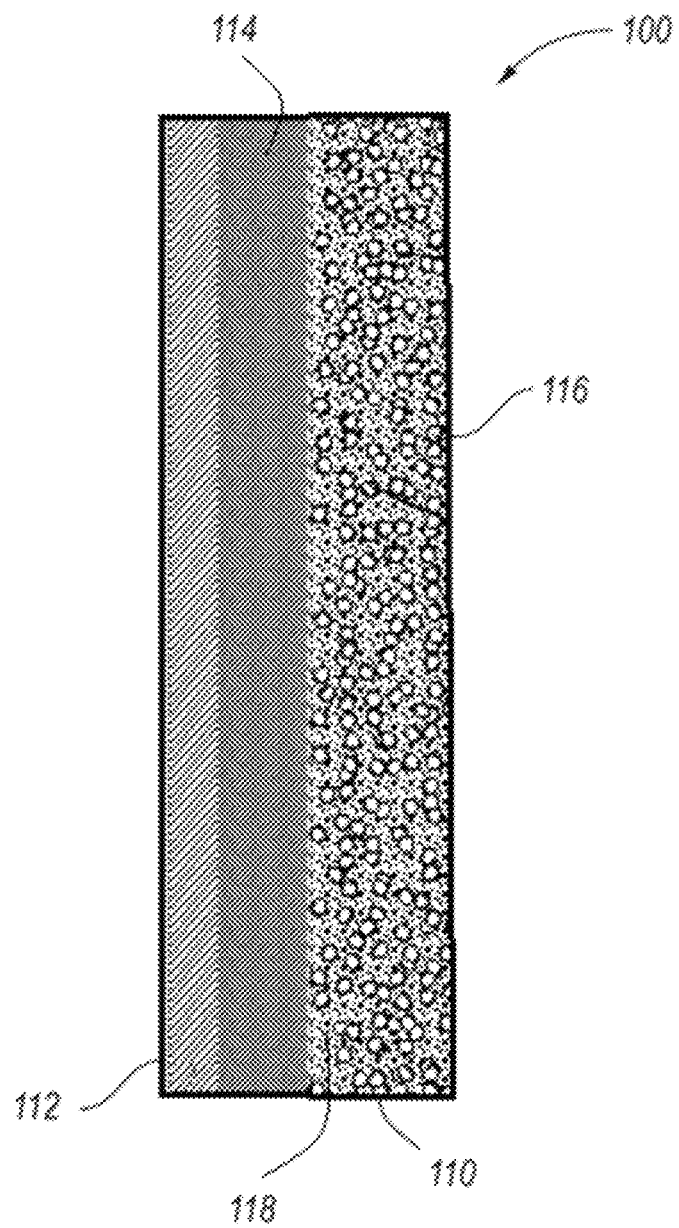

POLYMER ELECTROLYTE MATERIAL FOR LITHIUM BATTERY CELLS

TECHNICAL FIELD

The present disclosure is generally directed to polymer electrolyte materials for use with lithium battery cells and methods of producing the same. More specifically, the present disclosure relates to polymer electrolytes comprising fluorinated phosphonates.

BACKGROUND

While liquid electrolyte-based lithium-ion batteries are now a staple among rechargeable batteries, they can exhibit a number of limitations. Traditional liquid electrolyte-based lithium-ion batteries often feature, for example, relatively short lifespans and limited volumetric energy density. Traditional liquid electrolyte-based lithium-ion batteries can also pose significant safety risks when damaged. In view of such limitations, the use of polymer electrolytes in conjunction with lithium battery cells are of interest. Use of such materials in place of traditional liquid electrolytes promises several potential advantages such as superior energy density, mechanical properties, and flexibility along with enhanced safety. Despite these promises, many obstacles remain for advantageously implementing polymer electrolytes in lithium batteries.

SUMMARY

According to one embodiment, a polymer electrolyte material with the following structure is disclosed.

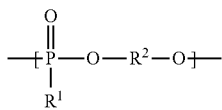

$R^1$ is $-CF_3$, $-(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE). Similarly, $R^2$ is $-(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE). In some embodiments, $R^1$ and $R^2$ may be selected independently from one another and may not include the same substituents. In other embodiments, $R^1$ and $R^2$ may comprise the same substituents. In some embodiments, the polymer may also contain a metal salt such as lithium salt.

In another embodiment, an electrochemical cell is disclosed. The electrochemical cell includes at least an anode, a cathode, and a polymer electrolyte material with the following structure.

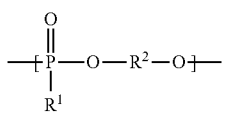

$R^1$ is $-CF_3$, $-(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE). Similarly, $R^2$ is $-(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE). In some embodiments, $R^1$ and $R^2$ may be selected independently from one another and may not include the same substituents. In other embodiments, $R^1$ and $R^2$ may comprise the same substituents. The electrochemical cell may further include a metal salt or combination of metal salts. Such metal salts may have a structure defined by $MX_n$, where M is Li, Na, K, Ca, or Mg; X is triflate, bis(trifluoromethanesulfonimide), bis(perfluoroethylsulfonylimide), $ClO_4$, bis(oxalate-borate), $BF_4$, $B(CN)_4$, or $PF_6$; and n is 1 or 2. Other appropriate metal salts can also be used in conjunction with certain embodiments. In some embodiments, the electrochemical cell may be a solid-state battery having a solid polymer electrolyte material, which serves the functions of both electrolyte and separator.

According to yet another embodiment, a method for producing fluorinated polyphosphonate polymer electrolyte materials is disclosed. The method includes mixing fluorinated alcohol with a base such as triethylamine ($Et_3N$) or pyridine and anhydrous tetrahydrofuran (THF). The mixture is then cooled to approximately 0° C. before gradually warming to room temperature during the addition of fluorinated phosphoryl chloride. The resultant polymerization solution is then added to hexanes and the precipitated fluorinated polyphosphonate polymer is collected. In accordance with certain embodiments, synthesis of the fluorinated polyphosphonate polymer electrolyte materials disclosed herein may be defined as follows:

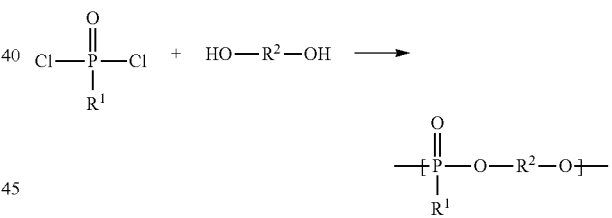

where $R^1$ is $-CF_3$, $-(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE) and $R^2$ is $-(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

BRIEF DESCRIPTION OF THE DRAWINGS

FIG. 1 is a schematic depiction of a solid-state battery according to one or more embodiments disclosed herein.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the FIGURES may be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

In this disclosure, the terms "negative electrode" and "anode" are both used to mean "negative electrode." Likewise, the terms "positive electrode" and "cathode" are both used to mean "positive electrode."

The term "solid polymer electrolyte" is used to mean a polymer electrolyte material that is solid at battery cell operating temperatures. Examples of useful battery cell operating temperatures include room temperature (25° C.), 40° C., and 80° C.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of embodiments known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Despite their prevalence, traditional lithium-ion batteries—which include liquid electrolytes—exhibit certain disadvantages. These disadvantages continue to drive interest in alternative battery types. One of the alternatives to traditional lithium-ion batteries are lithium-ion batteries that employ polymer electrolyte materials. Batteries that employ polymer electrolytes include solid-state batteries in which solid polymer electrolyte material serves the functions of both electrolyte and separator. Polymer electrolyte batteries may be flexible, thinner, and provide greater energy per unit weight than traditional lithium-ion batteries. They may also be safer than traditional lithium-ion batteries due to the replacement of the liquid electrolyte.

A frequently used material used for production of polymer electrolytes has been poly(ethylene oxide) (PEO). PEO, however, has several drawbacks such as temperature-dependent ion conductivity and low stability under highly oxidizing conditions. Such drawbacks limit the overall power, voltage, and temperature range at which batteries that use PEO electrolytes can operate. Other materials have been developed such as polycarbonate, polysiloxane, succinonitrile, or organic-inorganic hybrid composites.

Use of polyphosphonates as polymer electrolyte material in lithium batteries has shown good oxidation stability and may provide enhanced safety given their flame-retardant characteristics. Polyphosphonates as polymer electrolytes also demonstrate good solubility for common lithium salts used in lithium-ion batteries such as LiTFSI, for example. Accordingly, it would be useful to develop specific polyphosphonates for use as polymer electrolytes that have high lithium ion conductivity, good lithium salt solubility, and are stable at relatively high voltage.

In various embodiments, polyphosphonate polymer electrolyte materials are disclosed. Polyphosphonate polymer electrolytes can be mixed with lithium salts or other metal salts and used in conjunction a suitable anode and cathode to form an electrochemical cell. An example of such a polyphosphonate polymer electrolyte material is alkyl polyphosphonate defined by the following structure (I):

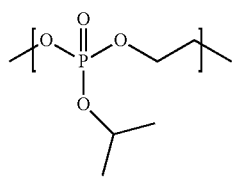

At useful battery cell operating temperatures, the conductivity of certain polyphosphonate polymer electrolyte materials may be improved by the introduction of fluorinated groups into the polymer main chain and/or side chain(s). Accordingly, in one or more embodiments, fluorinated polyphosphonates overcoming at least some of the drawbacks associated with other polymer electrolyte materials are disclosed. The disclosed fluorinated polyphosphonate material structures are adapted to provide high ionic conductivity, good salt solubility, and other beneficial physical properties.

Fluorinated polyphosphonates for use as electrolyte material in suitable battery cells can be defined by the following general structure (II):

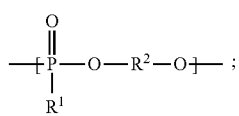

where $R^1$ is —$CF_3$, —$(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE), and $R^2$ is —$(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

In accordance with the present disclosure, fluorinated polyphosphonates of general structure (II) may include a variety of fluorinated substituents as $R^1$ and $R^2$. In some embodiments, $R^1$ and $R^2$ may be selected independently from one another and may not include the same substituents. In other embodiments, $R^1$ and $R^2$ may comprise the same substituents. According to at least one embodiment, $R^1$ is preferably —$CF_2CF_3$ and $R^2$ is preferably perfluoropolyether (PFPE). According to at least another embodiment, $R^1$ is preferably —$CF_3$, which may be interchangeably referred to herein as trifluoromethyl, and $R^2$ is preferably perfluoropolyether (PFPE). In another embodiment, both $R^1$ and $R^2$ are perfluoropolyether (PFPE). Throughout this disclosure, chemical compounds, molecules, constituent groups, polymer chains, etc. may be referred to by name, formula, structure, and/or abbreviation. As just one non-limiting example, perfluoropolyether may be referred to herein by its chemical structure or as perfluoropolyether, perfluoropolyether (PFPE), or simply PFPE.

Polymer electrolytes based on polyphosphonates—including those defined by the general structure (II) shown above—feature a variety of advantages. For example, the repeating P=O bond of the disclosed polymeric phosphonates beneficially impacts the material's ability to dissolve metal salts, which provides a path for ionic conduction. Additionally, polymeric phosphonates are generally non-crystalline and amorphous with low glass transition temperatures. As a result, they do not experience a drop in ionic conductivity due to crystallization over a wide range of operating temperatures. They are also highly oxidized, and thus flame retarding, making it difficult for further oxidization to occur. Accordingly, polymeric phosphonates are very stable at highly oxidizing voltages.

Polymer electrolytes based on fluorinated polyphosphonates defined by the general structure (II) also feature advantages over non-fluorinated polyphosphonates such as the alkyl polyphosphonate defined by structure (I). For example, fluorinated polyphosphonates of structure (II) may exhibit greater conductivity at useful battery cell operating temperatures than similar non-fluorinated polyphosphonates. This may be due to relative lowering of the polarity of the P=O bond through the introduction of the strong electron withdraw groups such as fluorinated alkyl and/or perfluoropolyether. Lowering of the relative polarity of the repeating P=O bond may result in enhanced mobility of the metal ions within the electrochemical cell.

Examples of simulated electrostatic charges for certain fluorinated and non-fluorinated polyphosphonates are shown in Table 1 below. $O^1$, $O^2$, $O^3$, and $O^4$ are used simply to denote specific regions of various polymer structures. The partial charges shown in Table 1 were calculated by quantum chemistry simulation in accordance with the OPLS (optimized potentials for liquid simulations) model. Specifically, the OPLS3 software package from Schrödinger, LLC was used to estimate the molecular mechanics force fields and thereby estimate the charges shown in Table 1.

TABLE 1

Comparison of Electrostatic Charges for Certain Fluorinated and Non-Fluorinated Polyphosphonates

| Compound No. | Chemical Structure | Calculated Electrostatic Charges in the Vicinity of the Phosphoryl Group | | | | |
|---|---|---|---|---|---|---|
| | | P Region | $O^1$ Region | $O^2$ Region | $O^3$ Region | $O^4$ Region |
| 1 | [structure] | +0.827 | −0.509 | −0.335 | −0.335 | — |
| 2 | [structure] | +0.815 | −0.504 | −0.334 | −0.334 | — |
| 3 | [structure] | +0.958 | −0.604 | −0.336 | −0.336 | −0.356 |

As shown in Table 1 above, the relative charges surrounding the P═O bond are less in both example fluorinated polyphosphonates as compared to the non-fluorinated polyphosphonate. For example, the electrostatic charge of the oxygen atom in the P═O bond is less negative in the two fluorinated polyphosphonate structures (approximately −0.5) than in the non-fluorinated polyphosphonate structure (approximately −0.6). Such relative charge reduction may lead to conductivity enhancements within polymer electrolytes comprising fluorinated polyphosphonates as compared to polymer electrolytes comprising non-fluorinated polyphosphonates.

As shown in Table 1, Compound 1 is a fluorinated polyphosphonate defined by general structure (II) in which $R^1$ is —$CF_2CF_3$ and $R^2$ is perfluoropolyether (PFPE). Compound 2 is also a fluorinated polyphosphonate defined by general structure (II) in which $R^1$ is —$CF_3$ and $R^2$ is perfluoropolyether (PFPE). Compound 3 is a non-fluorinated, alkyl polyphosphonate in accordance with structure (I). As recorded in Table 1, the electrostatic charge of the oxygen atom in the P═O bond of Compound 2 is less negative than that of Compound 1. Additionally, the electrostatic charge of the phosphorus atom in the P═O bond of Compound 2 is less positive than that of Compound 1. Such relative charge reduction may lead to conductivity enhancements within polymer electrolytes comprising Compound 2 as compared to polymer electrolytes comprising Compound 1.

The fluorinated polyphosphonate polymers disclosed herein may be combined with a metal salt to provide ionic conductivity. They may be combined with the following non-limiting example metal salts having the following general structure (III):

$$MX_n \quad (III),$$

where

M is Li, Na, K, Ca, or Mg,

X is triflate, bis(trifluoromethanesulfonimide), bis(perfluoroethylsulfonylimide), $ClO_4$, bis(oxalate-borate), $BF_4$, $B(CN)_4$, or $PF_6$, and n is 1 or 2, specifically n=1 for Li, Na, K and n=2 for Ca or Mg.

Other metals may be used, depending on the battery chemistry. The metal salts named above are suitable for a lithium battery cell. Other example salts may include NaTFSI or other salts appropriate for sodium ion insertion batteries with an anode such as organic carboxylates and a cathode such as hard carbon, hollow carbon nanowires, etc.

In one or more embodiments, polymer electrolyte materials defined by the fluorinated polyphosphonate of structure (II), when combined with an appropriate salt, is chemically and thermally stable and has an ionic conductivity of at least $10^{-4}$ S/cm at operating temperature. In at least one embodiment, the polymer electrolyte material has an ionic conductivity of at least $10^{-3}$ S/cm at operating temperature.

The fluorinated polyphosphonates disclosed herein may be used as polymer electrolytes in an electrochemical cell that also includes at least an anode and a cathode. Again, fluorinated polyphosphonates for use as polymer electrolytes can be defined by the following general structure (II):

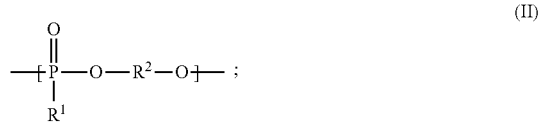

(II)

where $R^1$ is —$CF_3$, —$(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE), and $R^2$ is —$(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

In accordance with the present disclosure, fluorinated polyphosphonates of general structure (II) that are used as polymer electrolytes in electrochemical cells may include a variety of fluorinated substituents as $R^1$ and $R^2$. In some embodiments, $R^1$ and $R^2$ may be selected independently from one another and may not include the same substituents. In other embodiments, $R^1$ and $R^2$ may comprise the same substituents. According to at least one embodiment, $R^1$ is preferably —$CF_2CF_3$ and $R^2$ is preferably perfluoropolyether (PFPE). According to at least another embodiment, $R^1$ is preferably —$CF_3$ and $R^2$ is preferably perfluoropolyether (PFPE). In another embodiment, both $R^1$ and $R^2$ are perfluoropolyether (PFPE).

The electrochemical cell may further include a metal salt or combination of metal salts. Such metal salts may have a structure defined by $MX_n$, where M is Li, Na, K, Ca, or Mg; X is triflate, bis(trifluoromethanesulfonimide), bis(perfluoroethylsulfonylimide), $ClO_4$, bis(oxalate-borate), $BF_4$, $B(CN)_4$, or $PF_6$; and n is 1 or 2. Other appropriate metal salts can also be used in conjunction with certain embodiments. In some embodiments, the electrochemical cell may be a solid-state battery having a solid polymer electrolyte material, which serves the functions of both electrolyte and separator.

A schematic example embodiment of a solid-state battery or battery cell 100 according to one or more embodiments disclosed herein is depicted in FIG. 1. As can be seen in FIG. 1, a solid-state battery/battery cell 100 includes a cathode 110, an anode 112, and a separator electrolyte 114. The cathode 110 may include active material particles 116 surrounded by catholyte 118. The catholyte 118 may provide ionic communication between the separator electrolyte 114 and the cathode active particles 116. The catholyte 118 may act as a binder of the active material particles 116.

The battery 100 may be a lithium or lithium ion cell. The anode 112 active material may include any of a variety of materials depending on the type of chemistry for which the battery cell 100 is designed. The anode 112 material may include any material that can serve as a host material (i.e., can absorb and release) lithium ions. Examples of such materials include, but are not limited to graphite, lithium metal, and lithium alloys such as Li—Al, Li—Si, Li—Sn, and Li—Mg, Si and silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr), and mixtures thereof. Alternatively, graphite, metal oxides, silicon oxides, or silicon carbides may also be used as anode 112 materials.

The separator electrolyte 114 may include any of the polyphosphonate polymers disclosed herein including any of the fluorinated polyphosphonate polymers described by general formula (I) set forth above. The separator electrolyte 114 may include a mixture of polymers of various structures and compositions. In some embodiments, the described polymer electrolytes may be used as anolytes only in the anode. In such arrangements, the electrolytes may be mixed with anode 112 material such as graphite. It may also be useful to include the polymer electrolytes described herein in the cathode 110 to improve interfacial ionic transfer between the cathode 110 and the separator electrolyte 114. Fluorinated polyphosphonate according to the structures set forth herein may be added to the cathode 110 through intimate mixing with other cathode components. Alternatively, they may be added to the cathode 110 in the form of a block copolymers. Electronically conductive block copolymers may be added to the cathode 110. Examples include, but are not limited to, block copolymers of PPE and electronically conductive polymers such as polythiophene, polyvinylphenylene, polyaniline, polypyrrole, polyacetylene, polyphenylene sulfide, poly(3,4-ethylenedioxythiophene) (pedot), or polyfluorenes. In some embodiments, the described polymer electrolytes may be used as catholytes only in the cathode. In such arrangements, the electrolytes may be mixed with cathode active material such as those described in detail below.

According to at least one embodiment, the fluorinated polyphosphonate polymer electrolyte material does not include additives and the polymer electrolyte is a dry polymer. In other embodiments, additional species can be added to the polymer electrolytes described herein to enhance ionic conductivity, mechanical properties, or other properties that may be desirable. To improve conductivity, one or more additives in the ionically conductive phase can be added to the polymer electrolyte material, for example. Such additives can improve ionic conductivity by lowering the degree of crystallinity, lowering the melting temperature, lowering the glass transition temperature, or increasing chain mobility. High dielectric additives can aid dissociation of the salt, thereby increasing the number of Li+ ions available for ion transport. Ionic-conductivity-enhancing additives include low molecular weight conductive polymers, ceramic particles, room temp ionic liquids, high dielectric organic plasticizers, and Lewis acids. Other additives can also be readily used in the polymer electrolytes described herein.

In other embodiments, ceramic electrolytes are added to the block copolymer. Non-limiting examples of additive ceramic electrolytes that can be used include lithium silicate, lithium borate, lithium aluminate, lithium phosphate, lithium phosphorus oxynitride, lithium silicosulfide, lithium borosulfide, lithium aluminosulfide, and lithium phosphosulfide, lithium lanthanum titanium oxide, lithium lanthanum zirconium oxide, LiPON, LiSCON, $Li_{10}SnP_2S_{12}$, $Li_{11}Si_2PS_{12}$, $Li_{10}GeP_2S_{12}$, $Li_2S$—$SiS_2$—$Li_3PO_4$, $Li_{14}Zn(GeO_4)_4$, $Li_2S$—$P_2S_5$, $La_{0.5}Li_{0.5}TiO_3$, combinations thereof, and others known to those of skill in the art.

The cathode active material may be any of a variety of materials depending on the type of chemistry for which the battery cell 100 is designed. The cathode active material particles 116 may include one or more of the following: sulfur, microstructured carbon/sulfur composites, lithium peroxides, metal alloys of lithium, or organometallic molecules. For example, the cathode active material particles may include lithium iron phosphate ($LiFePO_4$, LFP), $LiCoO_2$, $LiMn_2O_4$, lithium nickel cobalt aluminum oxide ($LiNiCoAlO_2$, NCA), lithium nickel cobalt manganese oxide (LiNiMnCo, NCM), or any combination thereof. Additional examples of cathode active materials include, but are not limited to materials described by the following general structure (IV):

$$Li_xA_{1-y}M_yO_2 \tag{IV}$$

where
A is at least one transition metal such as Mn, Co, and Ni,
M is B, Mg, Ca, Sr, Ba, Ti, V, Cr, Mn, Fe, Co, Ni, Cu, Al, In, Nb, Mo, W, Y, and Rh, or a combination thereof,
x is 0.05≤x≤1.1, and
y is 0≤y≤0.5.

An example cathode material is $LiNi_{0.2}Mn_{0.5}O_2$.

Alternatively, the cathode active material may be described by the following general structure (V):

$$Li_xMn_{2-y}M_yO_2 \tag{V}$$

where
M is Mn, Ni, Co, Cr, or a combination thereof,
x is 0.05≤x≤1.1, and
y is 0≤y≤2.

Alternatively still, the cathode active material may be described by the following general structure (VI):

$$Li_xM_yMn_{4-y}O_8 \tag{VI}$$

where
M is Fe, Co, or both,
x is 0.05≤x≤2, and
y is 0≤y≤4.

Further still, the cathode electrode active material may be described by the following general structure (VII):

$$Li_x(Fe_yM_{1-y})PO_4 \tag{VII}$$

where
M is chosen from transition metals such as Mn, Co and/or Ni,
x is 0.9≤x≤1.1, and
y is 0≤y≤1.

In yet another embodiment, the cathode active material may be described by the following general structure (VIII):

$$Li(Ni_{0.5-x}Co_{0.5-x}M_{2x})O_2 \tag{VIII}$$

where
M is chosen from Al, Mg, Mn, and/or Ti,
and x is 0≤x≤0.2.

In one or more embodiments, a process for production of the polymer electrolyte material is disclosed. The fluorinated polyphosphonate polymer electrolyte materials may be synthesized using polycondensation, single monomer condensation, and ring opening techniques.

A non-limiting example of a polymer synthesis of the fluorinated polyphosphonate polymer electrolyte materials described herein includes the synthesis reaction described by the following equation (IX):

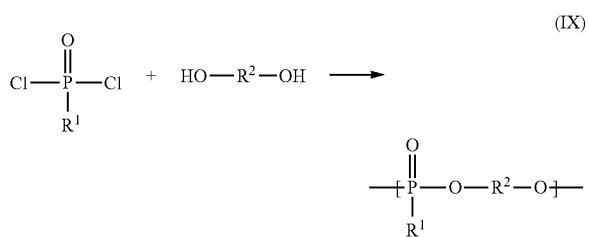

(IX)

where
$R^1$ is —$CF_3$, —$(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE), and $R^2$ is $-(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

In accordance with the present disclosure, polymer synthesis of the fluorinated polyphosphonate polymer electrolyte materials described herein includes the synthesis reaction described by equation (IX) wherein a variety of fluorinated substituents comprise $R^1$ and $R^2$. In some embodiments, $R^1$ and $R^2$ may be selected independently from one another and may not include the same substituents. In other embodiments, $R^1$ and $R^2$ may comprise the same substituents. According to at least one embodiment, $R^1$ within a synthesis reaction described by equation (IX) is preferably $-CF_2CF_3$ and $R^2$ is preferably perfluoropolyether (PFPE). According to at least another embodiment, $R^1$ within a synthesis reaction described by equation (IX) is preferably $-CF_3$ and $R^2$ is preferably perfluoropolyether (PFPE). In another embodiment, both $R^1$ and $R^2$ within a synthesis reaction described by equation (IX) are perfluoropolyether (PFPE).

In accordance with the equation set forth above, fluorinated polyphosphonate polymer electrolyte material is synthesized by mixing fluorinated phosphoryl chloride with fluorinated alcohol. According to a non-limiting example of such synthesis, 10 mmol of fluorinated alcohol is mixed with 20 mmol of base such as triethylamine ($Et_3N$) or pyridine at room temperature. The mixture is then placed into 50 ml of anhydrous tetrahydrofuran (THF). The mixture is thereafter cooled to approximately 0° C. 10 mmol of fluorinated phosphoryl chloride is then added dropwise and the mixture is stirred and gradually warmed to room temperature overnight. The resultant polymerization solution is then added into hexanes and the precipitated product is collected after vacuum drying to yield the oil.

A non-limiting example of an assembled solid-state battery cell with the polymer electrolyte material described above may be built. The example battery cell may include a laminate structure including discreet layers of the cathode/polymer or separator electrolyte/anode. The anode may be a lithium anode. The polymer/separator electrolyte may be composed of the polyphosphonate materials described herein. The thickness of the polymer electrolyte may be about 10-30, 12-25, or 15-20μ. The thickness of the lithium layer may be about 5-50, 10-40, or 20-30μ. The laminate may be placed into and sealed in a pouch. The battery cell may be cycled at either 3V-4.2V or 3V-4.3V.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A polymer electrolyte material, comprising:
a polymer structure described by:

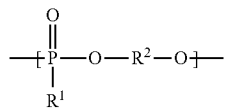

where
$R^1$ is $-CF_3$, $-(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE), and
$R^2$ is $-(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

2. The polymer electrolyte material of claim 1, wherein $R^1$ is $-CF_3$ and $R^2$ is perfluoropolyether (PFPE).

3. The polymer electrolyte material of claim 1, wherein the polymer electrolyte material has an ionic conductivity greater than $10^{-4}$ S/cm.

4. The polymer electrolyte material of claim 1, wherein the polymer electrolyte material has an ionic conductivity greater than $10^{-3}$ S/cm.

5. The polymer electrolyte material of claim 1 further comprising one or more metal salts.

6. The polymer electrolyte material of claim 5, wherein the one or more metals salts having a structure described by:

$$MX_n,$$

where
M is Li, Na, K, Ca, or Mg,
X is triflate, bis(trifluoromethanesulfonimide), bis(perfluoroethylsulfonylimide), $ClO_4$, bis(oxalate-borate), $BF_4$, $B(CN)_4$, or $PF_6$, and
n is 1 or 2.

7. An electrochemical cell, comprising:
an anode configured to absorb and release lithium ions;
a cathode; and
a polymer electrolyte material having a polymer structure described by:

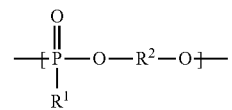

where
$R^1$ is $-CF_3$, $-(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE), and
$R^2$ is $-(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

8. The electrochemical cell of claim 7, wherein the polymer electrolyte material is solid and the electrochemical cell is a solid-state battery.

9. The electrochemical cell of claim 7, wherein $R^1$ is $-CF_3$ and $R^2$ is perfluoropolyether (PFPE).

10. The electrochemical cell of claim 7, wherein the polymer electrolyte material has an ionic conductivity greater than $10^{-4}$ S/cm.

11. The electrochemical cell of claim 7, wherein the polymer electrolyte material has an ionic conductivity greater than $10^{-3}$ S/cm.

12. The electrochemical cell of claim 7, wherein the polymer electrolyte material further comprises ceramic electrolyte particles.

13. The electrochemical cell of claim 7, wherein the cathode comprises cathode active particles and a catholyte.

14. The electrochemical cell of claim 7, wherein the polymer electrolyte material further comprises one or more metal salts.

15. The electrochemical cell of claim 14, wherein the one or more metals salts having a structure described by:

$MX_n$, where

M is Li, Na, K, Ca, or Mg,

X is triflate, bis(trifluoromethanesulfonimide), bis(perfluoroethylsulfonylimide), $ClO_4$, bis(oxalate-borate), $BF_4$, $B(CN)_4$, or $PF_6$, and n is 1 or 2.

16. A method of forming a polymeric material, the method comprising:

mixing a fluorinated alcohol with a base to form a first mixture;

adding the first mixture to an organic solvent to form a second mixture;

cooling the second mixture to approximately 0° C.; and adding fluorinated phosphoryl chloride to the second mixture to form a polymerization solution from which the polymeric material can be collected, the polymeric material having a polymer structure described by:

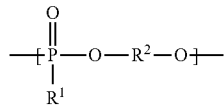

where $R^1$ is —$CF_3$, —$(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE), and $R^2$ is —$(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

17. The method of claim 16, wherein the fluorinated alcohol has a structure described by:

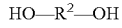

where $R^2$ is —$(CF_2)_n$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

18. The method of claim 16, wherein the fluorinated phosphoryl chloride has a structure described by:

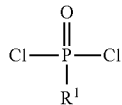

where $R^1$ is —$CF_3$, —$(CF_2)_nCF_3$ and n is an integer ranging from 1 to 10, perfluoropolyether (PFPE), polyvinylidene fluoride (PVDF), polytetrafluoroethylene (PTFE), fluorinated ethylene propylene (FEP), ethylene fluorinated ethylene propylene (EFEP), or polyethylene tetrafluoroethylene (ETFE).

19. The method of claim 16, wherein the method further comprises incorporating a metal salt into the polymer material to form a polymer electrolyte material.

20. The method of claim 19, wherein the polymer electrolyte material has an ionic conductivity greater than $10^{-4}$ S/cm.

* * * * *